(12) United States Patent
Chase et al.

(10) Patent No.: US 11,221,454 B2
(45) Date of Patent: Jan. 11, 2022

(54) OPTICAL INTERCONNECT ASSEMBLIES AND ASSOCIATED SYSTEMS FOR LARGE-SCALE SPINE AND LEAF TOPOLOGIES

(71) Applicant: CORNING RESEARCH & DEVELOPMENT CORPORATION, Corning, NY (US)

(72) Inventors: Sara Ann Chase, Maiden, NC (US); Brian Keith Rhoney, Denver, NC (US); Antwan Joco'ques Works, Lewisville, TX (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/869,974

(22) Filed: May 8, 2020

(65) Prior Publication Data

US 2020/0264394 A1 Aug. 20, 2020

Related U.S. Application Data

(63) Continuation of application No. PCT/US2018/061179, filed on Nov. 15, 2018.
(Continued)

(51) Int. Cl.
*G02B 6/00* (2006.01)
*G02B 6/44* (2006.01)
(Continued)

(52) U.S. Cl.
CPC ......... *G02B 6/4452* (2013.01); *G02B 6/3897* (2013.01); *H04B 10/25* (2013.01); *H04B 10/27* (2013.01)

(58) Field of Classification Search
CPC .. G02B 6/4452; G02B 6/3897; G02B 6/3885; G02B 6/00; H04B 10/25; H04B 10/27
See application file for complete search history.

(56) References Cited

U.S. PATENT DOCUMENTS

| 6,134,357 A | 10/2000 | MacDonald |
| 6,424,781 B1 | 7/2002 | Puetz et al. |

(Continued)

FOREIGN PATENT DOCUMENTS

EP 2241915 A1 10/2010

OTHER PUBLICATIONS

International Search Report and Written Opinion of the International Searching Authority; PCT/US2018/061179; dated Jan. 24, 2019; 9 Pages; ISA/US Commissioner for Patents.
(Continued)

*Primary Examiner* — Jennifer Doan
(74) *Attorney, Agent, or Firm* — Adam R. Weeks

(57) ABSTRACT

An optical interconnect module comprises a housing including a front-facing portion that includes a first face and a second face, wherein the first face of the front-facing portion is angled relative to the second face of the front-facing portion. The housing also includes a rear-facing portion opposing the front facing portion, the rear-facing portion including a first face and a second face, wherein the first face of the rear-facing portion is angled relative to the second face of the rear-facing portion. The housing further includes an internal chamber disposed between the front-facing portion and the rear-facing portion. A first plurality of multifiber connectors is disposed on the front-facing portion of the housing, and a first plurality of multifiber connectors disposed on the rear-facing portion of the housing. Each connector of the first plurality of multifiber connectors disposed on the front-facing portion is optically connected to
(Continued)

each connector of the first plurality of multifiber connectors disposed on the rear-facing portion by at least a pair of optical fibers.

19 Claims, 11 Drawing Sheets

Related U.S. Application Data

(60) Provisional application No. 62/588,667, filed on Nov. 20, 2017.

(51) Int. Cl.
*G02B 6/38* (2006.01)
*H04B 10/25* (2013.01)
*H04B 10/27* (2013.01)

(56) References Cited

U.S. PATENT DOCUMENTS

| | | | |
|---|---|---|---|
| 6,866,541 | B2 | 3/2005 | Barker et al. |
| 7,945,135 | B2 | 5/2011 | Cooke et al. |
| 9,128,214 | B2 | 9/2015 | Wakjira et al. |
| 9,154,860 | B2 | 10/2015 | Hessong et al. |
| 10,911,846 | B2 * | 2/2021 | Kucharewski ..... H04Q 11/0071 |
| 2005/0233647 | A1 | 10/2005 | Denovich et al. |
| 2007/0298652 | A1 | 12/2007 | Clark et al. |
| 2009/0067800 | A1 | 3/2009 | Vazquez et al. |
| 2009/0236117 | A1 | 9/2009 | Garza et al. |
| 2010/0254703 | A1 | 10/2010 | Kirkpatrick et al. |
| 2014/0270762 | A1 | 9/2014 | Li et al. |
| 2015/0230007 | A1 | 8/2015 | Hessong et al. |
| 2015/0295655 | A1 | 10/2015 | Hessong et al. |
| 2016/0269229 | A1 | 9/2016 | Franke et al. |
| 2017/0045700 | A1 | 2/2017 | Conrad et al. |
| 2019/0253777 | A1 * | 8/2019 | Yang ................. H04Q 11/0071 |

OTHER PUBLICATIONS

European Patent Application No. 18878762.6 Office Action dated Oct. 16, 2020; 8 Pages; European Patent Office.

Hewlett-Packard Development Company, L.P., "HP Cluster Platform Gigabit Ethernet Interconnect Guide.", Datasheet. Hewlett-Packard Development Company, L.P, 2007 [online] <URL: https://support.hpe.com/hpsc/doc/public/display?docid=emr_na-c02009442>.

International Search Report and Written Opinion of the International Searching Authority; PCT/US18/061432; dated Jan. 25, 2019; 9 Pages; Commissioner for Patents.

Supplementary European search report dated Oct. 16, 2020 for EP Application No. 18878762.

* cited by examiner

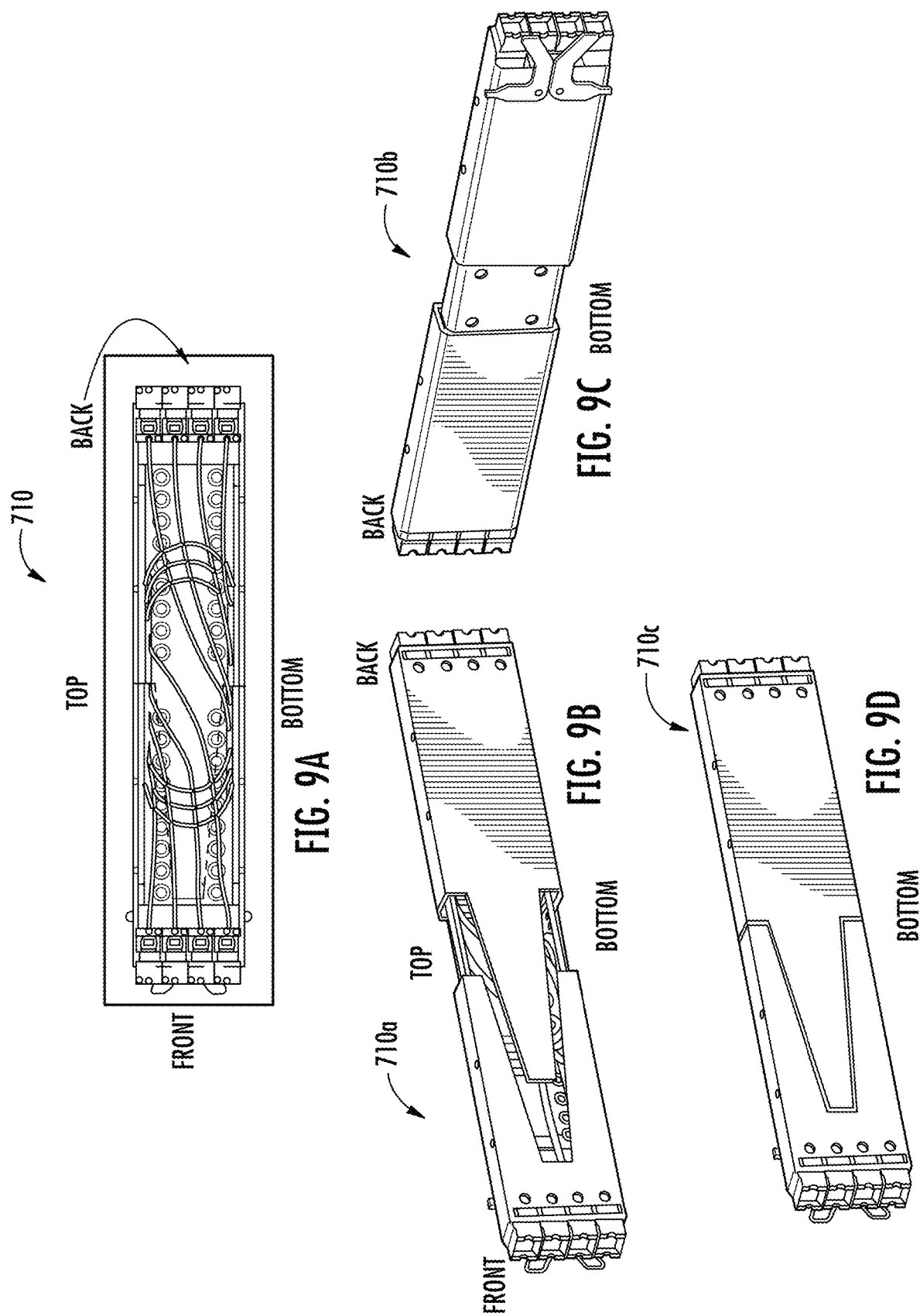

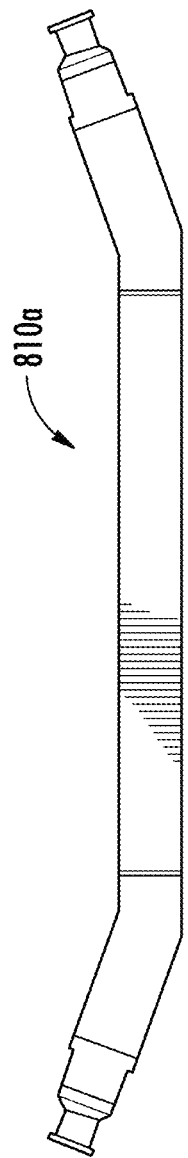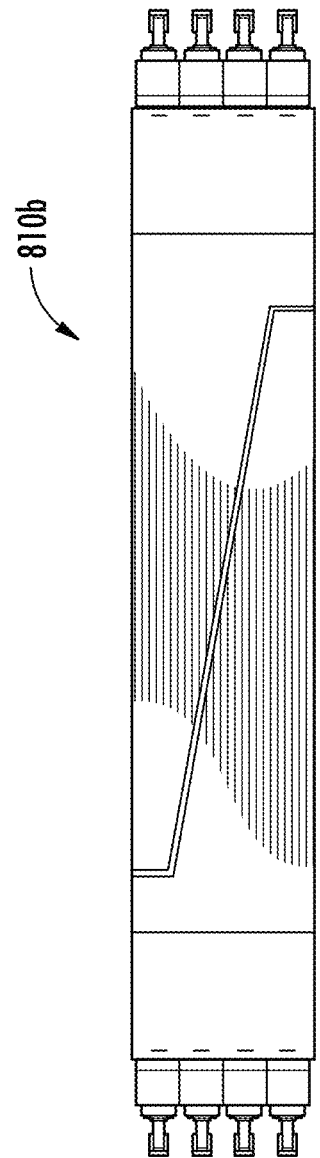

OPTICAL INTERCONNECT ASSEMBLIES AND ASSOCIATED SYSTEMS FOR LARGE-SCALE SPINE AND LEAF TOPOLOGIES

PRIORITY APPLICATIONS

This application is a continuation of International Application No. PCT/US18/61179, filed on Nov. 15, 2018, which claims the benefit of priority to U.S. Application No. 62/588,667, filed on Nov. 20, 2017, both applications being incorporated herein by reference.

TECHNICAL FIELD

The present disclosure relates generally to equipment for large-scale spine and leaf networks and, more particularly, to high-capacity optical interconnect assemblies and systems for facilitating large-scale spine and leaf topologies in a data center environment.

BACKGROUND

A data center is a location that houses computers and related telecommunications equipment and components for the purpose of processing (e.g., receiving, storing, managing and transmitting) data. Data centers often need to be expanded or "scaled out," wherein hardware is added to accommodate the increasing data-processing demands. It is thus desirable that the data-center hardware be configured in a manner that is scalable, i.e., that can support scale out of the hardware such that the data-processing performance of the data center improves in direct proportion to the added capacity.

Traditional data-center architectures have relied on a three-tier switching architecture whereby network reliability and scale-out capability is accomplished through switch redundancy. However, the three-tier switching architecture is not optimal for certain types of data centers, such as Internet data centers, that process relatively large amounts of data. For example, as the size of the network grows, conventional three-tiered models can lead to inefficiencies in the network because of the unpredictability of distances between routing pathways that link different devices. Such delays increase network latency—a problem that is exacerbated as the data center is "scaled out" to accommodate increased traffic volume, particularly for "east-west" traffic within the data center.

As an alternative to the three-tiered switching topology, leaf-spine network topologies were developed to address latency issues caused by the more complicated three-tiered model. The leaf-spine topology relies on a wiring scheme in which a wiring mesh is created to ensure that all the devices in the data center are the same number of segments away, thereby ensuring that the delay or latency of information traveling through the "mesh" is consistent throughout the network. Further, because every leaf switch is interconnected with each and every spine switch and because the latency between each segment is relatively uniform, each route in the network can be active, allowing all connections to be utilized at the same time, increasing the overall efficiency of the data center.

The presently disclosed optical interconnect assemblies and systems for facilitating large-scale spine and leaf topologies in a data center environment are directed toward overcoming one or more of the problems set forth above.

SUMMARY

In accordance with one aspect, the present disclosure is directed toward a high-capacity optical interconnect module for facilitating large-scale spine and leaf topologies, comprising a housing including a front-facing portion that includes a first face and a second face, the first face of the front-facing portion being angled relative to the second face of the front-facing portion. The housing may also include a rear-facing portion opposing the front facing portion, the rear-facing portion including a first face and a second face, the first face of the rear-facing portion being angled relative to the second face of the rear-facing portion. The housing may further include an internal chamber disposed between the front-facing portion and the rear-facing portion. a first plurality of multifiber connectors disposed on the front-facing portion of the housing, and a first plurality of multifiber connectors disposed on the rear-facing portion or the housing. Each connector of the first plurality of multifiber connectors disposed on the front-facing portion may be optically connected to each connector of the first plurality of multifiber connectors disposed on the rear-facing portion via at least a pair of optical fibers.

According to another aspect, the present disclosure is directed toward a data center network environment, comprising a high-capacity optical interconnect module for facilitating large-scale spine and leaf topologies. The high-capacity optical interconnect module may include a front-facing portion that includes a first face and a second face. The high-capacity optical interconnect module may also include a rear-facing portion opposing the front facing portion, the rear-facing portion including a first face and a second face. The high-capacity optical interconnect module may further include an internal chamber disposed between the front-facing portion and the rear-facing portion. A first plurality of multifiber connectors may be disposed on the front-facing portion, wherein the first plurality of multifiber connectors disposed on the front-facing portion is aligned in a first column of the front-facing portion. A first plurality of multifiber connectors may be disposed on the rear-facing portion, wherein the first plurality of multifiber connectors disposed on the rear-facing portion is aligned in a first column of the rear-facing portion. Each connector of the first plurality of multifiber connectors disposed on the front-facing portion is optically connected to each connector of the first plurality of multifiber connectors disposed on the rear-facing portion by at least a pair of optical fibers.

BRIEF DESCRIPTION OF THE DRAWINGS

FIGS. 9A, 9B, 9C, and 9D illustrate alternative views of an exemplary modular mesh wiring block designed to fit within a corresponding slot in an exemplary 1U module for large scale implementation of a spine-and-leaf network topology, in accordance with certain disclosed embodiments;

FIGS. 10A and 10B illustrate alternative views of an exemplary modular mesh wiring block designed to fit within a corresponding slot in an exemplary 1U module for large scale implementation of a spine-and-leaf network topology, consistent with certain disclosed embodiments.

DETAILED DESCRIPTION

Figure 1:
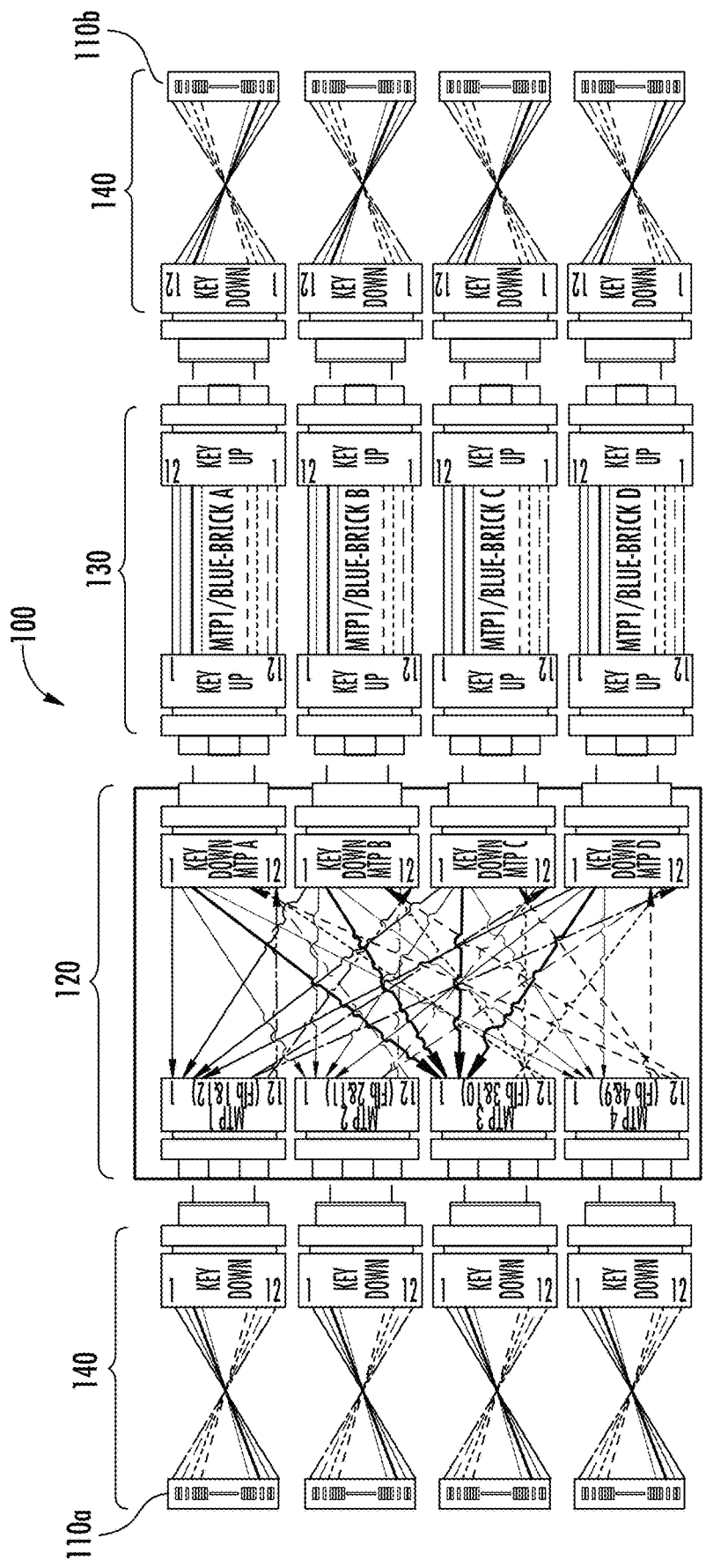
FIG. 1 illustrates as exemplary wiring schematic for implementing spine-and-leaf network topologies in which a single spine switch optically connected to a single leaf switch via a single optical interconnection assembly, consistent with certain disclosed embodiments.

FIG. 1 illustrates a schematic diagram of an exemplary spine-and-leaf network 100 that includes an optical interconnection assembly 120 connecting a single spine switch (110a) to a single leaf switch (110b), via one or more patch cords 140 and/or trunks 130. Spine-and-leaf network topology 100 may include or embody any combination of network components that facilitates providing distinctive data connectivity/interconnection paths to as many different network nodes (e.g., switches, routers, etc.) as possible in a "mesh" configuration, essentially creating what is referred to as a network "fabric." In certain applications, such connectivity may be provided using mesh wiring schemes using one or more optical interconnection assemblies, such as optical interconnection module 120 of FIG. 1.

The optical interconnection assembly 120 may embody a fiber optic module having a plurality of connectors at a first connection location (e.g., the front face of the module or "spine-side") and a second connection location (e.g., the rear face of the module or "leaf-side"). According to one embodiment, the plurality of connectors may include a plurality of multifiber connectors, such as MTP or MPO connectors. For example, as illustrated in FIG. 1, spine-side multifiber components and leaf-side multifiber components may comprise MTP connectors, such as MTP1, MTP2, MTP3, and MTP4 (MTP1-MTP4) and MTP A, MTP B, MTP C, and MTP D (MTPA-MTPD) respectively.

Furthermore, example spine-side patch cords and leaf-side patch cords 140 are shown as respectively including optical fibers and that terminate at their respective ends with MTP connectors. In one exemplary embodiment, MTP connectors associated with patch cords 140 are MTP connectors that are plugged into multifiber components in the form of quad-small-form-factor-pluggable (QSFP) transceivers on spine switches 110a and leaf switches 110b.

Figure 2:
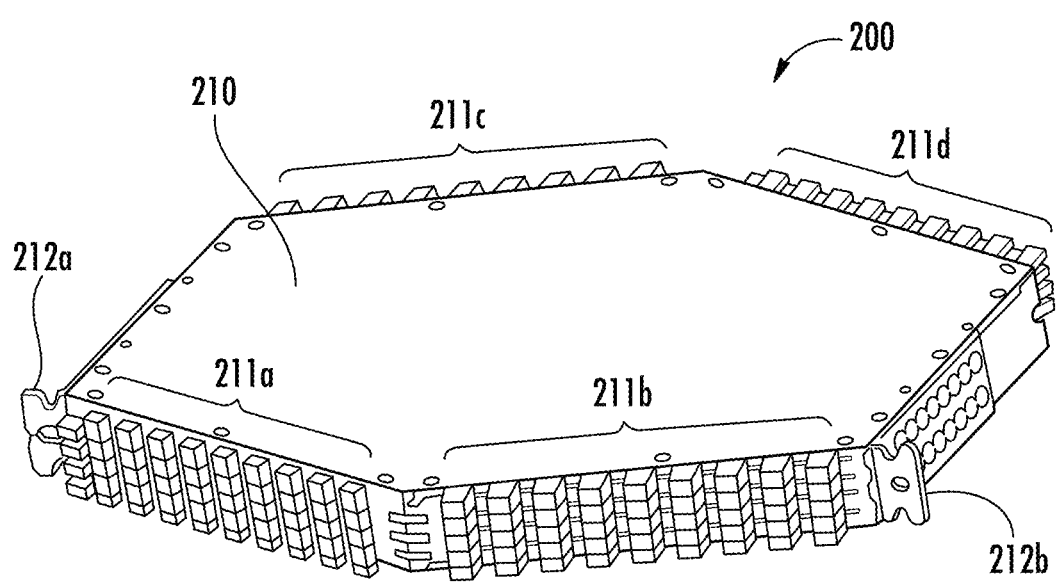
FIG. 2 provides a diagrammatic perspective view of a rack-mountable 1U module for large-scale implementation of the spine-and-leaf network topology using, in part, the exemplary wiring schematic illustrated in FIG. 1, in accordance with certain disclosed embodiments.

FIG. 2 illustrates an exemplary high-capacity optical interconnect module 200 for facilitating large-scale spine and leaf topologies. According to the embodiment illustrated in FIG. 2, high-capacity optical interconnect module 200 may comprising a housing 210, a front-facing portion that includes a first face 211a and a second face 211b. As shown in FIG. 2 and in accordance with at least one embodiment, the first face 211a of the front-facing portion being angled relative to the second face 211b of the front-facing portion. Housing 210 may also include a rear-facing portion opposing the front facing portion, the rear-facing portion including a first face 211c and a second face 211d, the first face 211c of the rear-facing portion being angled relative to the second face 211d of the rear-facing portion. Housing 210 may also include an internal chamber (not separately numbered, but shown in FIG. 3 when cover of housing 210 is removed) disposed between the front-facing portion and the rear-facing portion. Housing 210 may also include a plurality of brackets 212a and 212b for mounting of high-capacity optical interconnect module 200 in a standard telecommunications or data center rack. As will be explained in greater detail below, it is contemplated that, although high-capacity optical interconnect module 200 is illustrated as being sized to fit in a standard "1U" (or 1 rack-unit) space, it is contemplated that high-capacity optical interconnect module 200 may include or embodiment any size or shape (e.g., 2U, 4U, etc.) Alternatively or additionally, it is also contemplated that high-capacity optical interconnect module 200 may be configured for use in applications other than conventional rack-mounting, such as wall-mount, floor mount, etc.

As shown in FIG. 2, front-facing portion of housing 210 may include a first plurality of multifiber connectors disposed on the front-facing portion. Similarly, rear-facing portion of housing 210 may include a first plurality of multifiber connectors disposed on the rear-facing portion. According to one exemplary embodiment, multifiber connectors may include or embody MTP connectors, MPO connectors, or any other suitable multifiber connector.

Figure 3:
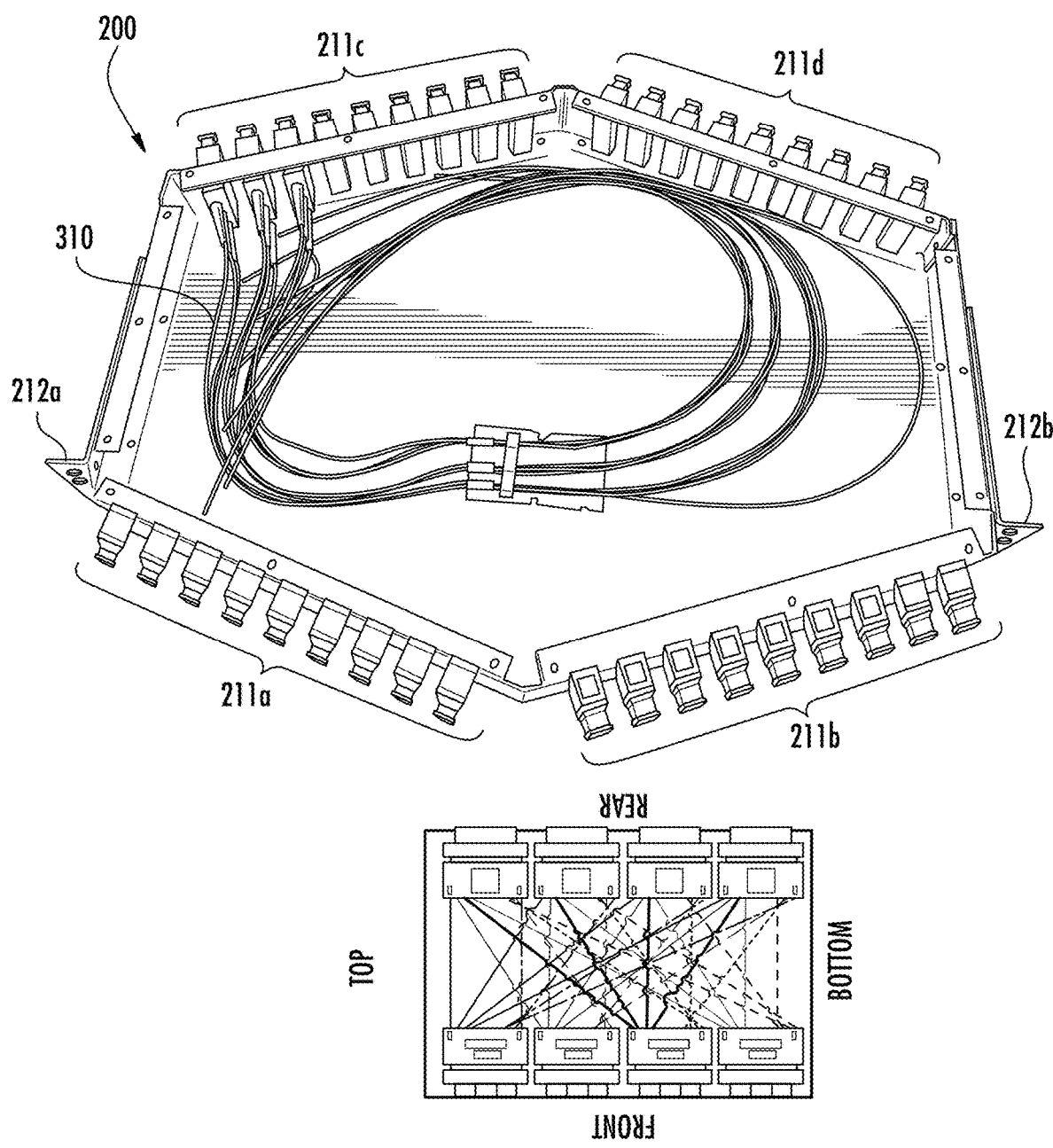
FIG. 3 provides an overhead perspective view of a portion of the internal wiring (and corresponding wiring schematic) of an exemplary 1U module for large scale implementation of a spine-and-leaf network topology, consistent with certain disclosed embodiments.

FIG. 3 provides an overhead view of a portion of the internal wiring construction of high-capacity optical interconnect module 200. As illustrated in FIG. 3, high-capacity optical interconnect module 200 may include one or more internal wiring harnesses or cable assemblies for facilitating the mesh (or spine-and-leaf wiring topology), such as that shown in the wiring scheme in FIG. 3, in which each connector of the first plurality of multifiber connectors disposed on the front-facing portion is optically connected to each connector of the first plurality of multifiber connectors disposed on the rear-facing portion by at least a pair of optical fibers.

According to one embodiment, each of the multifiber connectors may include or embody 8-fiber connectors, with 4 channels of each connector dedicated to support transmit (e.g., leaf-to-spine) network traffic, and the remaining 4 channels of each connector dedicate to support receive (e.g., spine-to-leaf) network traffic. As such, the mesh is realized by the interconnection of each of the 4 multifiber connectors on the front-facing portion of the high-capacity optical interconnect module 200 with the 4 multifiber connectors on the rear-facing portion of the high-capacity optical interconnect module 200 using a pair of fibers (one fiber of the pair for transmit (e.g., leaf-to-spine) traffic and one fiber of the pair for receive (e.g., spine-to-leaf) traffic).

Figure 4:
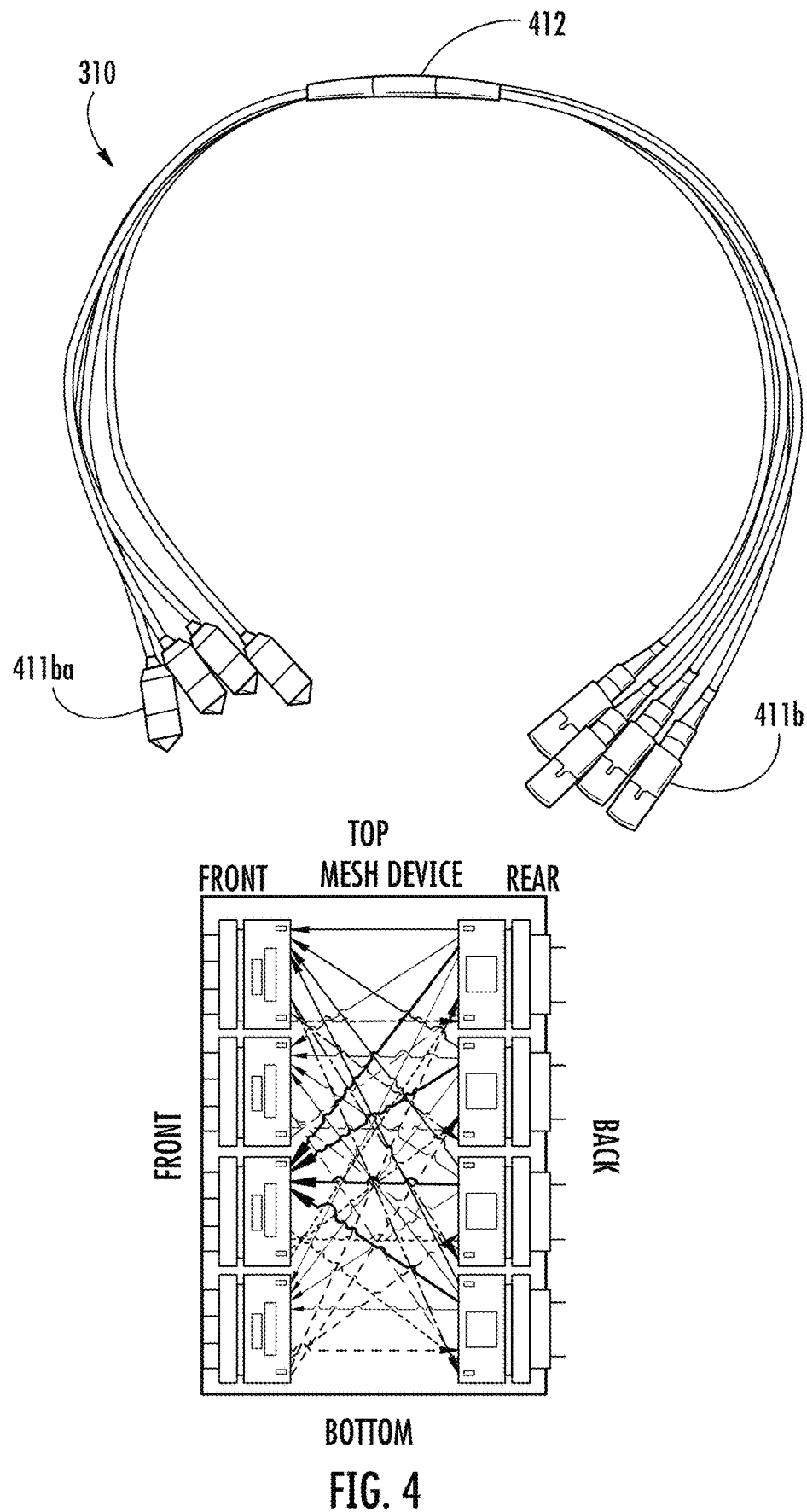
FIG. 4 illustrates an exemplary wiring harness/cable assembly (and corresponding wiring schematic) for use with the module for large-scale implementation of the spine-and-leaf network topology, in accordance with one or more disclosed embodiments.

According to one embodiment, an in connection with the 8-fiber mesh examples above, it is contemplated that the spine-and-leaf mesh wiring scheme is facilitated by a wiring harness 310, such as that illustrated in FIG. 4. As shown in FIG. 4, the function/cable assembly 412 is manufactured to achieve the wiring scheme shown in FIG. 4. While FIG. 4 illustrates a 8-connector (including 4 spine-side connectors 411ba and 4 leaf-side connectors 411b), 8-fiber-per-connector harness that is wired for spine-and-leaf mesh polarity, it is contemplated that any of a number of multifiber variations can be used without departing from the scope of the present disclosure.

Figure 5:
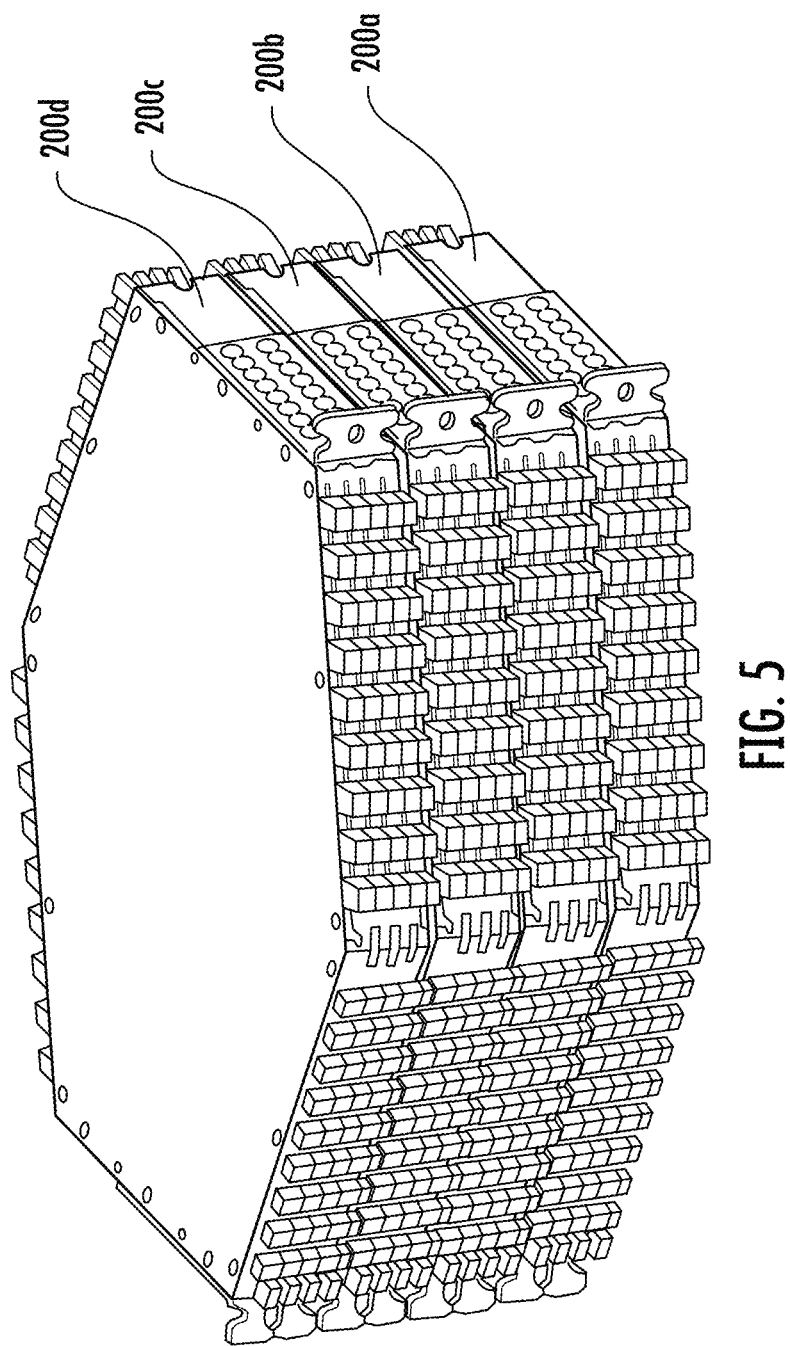
FIG. 5 provides a diagrammatic perspective view illustrating a plurality of 1U modules for large-scale implementation of the spine-and-leaf network topology that have using, in part, the exemplary wiring schematic illustrated in FIG. 1, in accordance with certain disclosed embodiments.

FIG. 5 illustrates one embodiment of a 4U version of high-capacity optical interconnect module 200. In the embodiment of FIG. 5, the 4U housing may be realized by the "stacking" of four 1U high-capacity optical interconnect modules 200a-200d, such as is illustrated in FIG. 2. Alternatively or additionally, it is contemplated that a 4U version of high-capacity optical interconnect module 200 may be implemented using a single, common housing.

Figure 6:
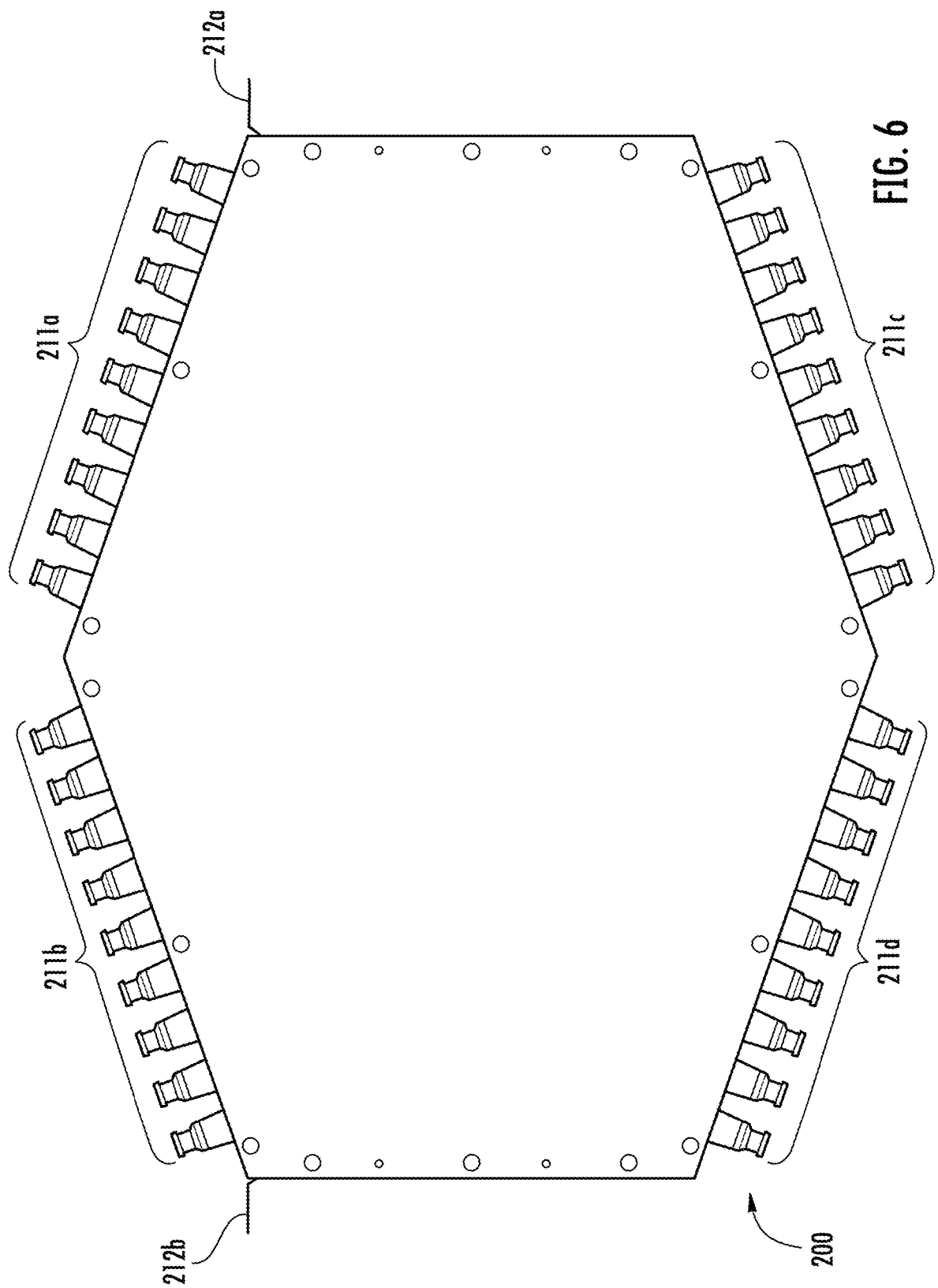
FIG. 6 provides an overhead view of a housing of an exemplary 1U module for large scale implementation of a spine-and-leaf network topology, consistent with certain disclosed embodiments.

FIG. 6 illustrates a top-down view of high-capacity optical interconnect module 200. The view of FIG. 6 is intended to highlight the increased density afforded by the relative angling of each of the faces of front-facing portion and rear-facing portion to increase the amount of surface area that is available for multifiber connectors, while still maintaining finger access spacing. It is, however, contemplated that the faces of front-facing and rear-facing portions of high-capacity optical interconnect module 200 may not be angled with respect to one another. In one embodiment, the number of optical connections provided by each of the front-facing and rear-facing portions of high-capacity optical interconnect module 200 are configured to support at least 576 optical connections per 1U high-capacity optical interconnect module 200.

Figure 7:
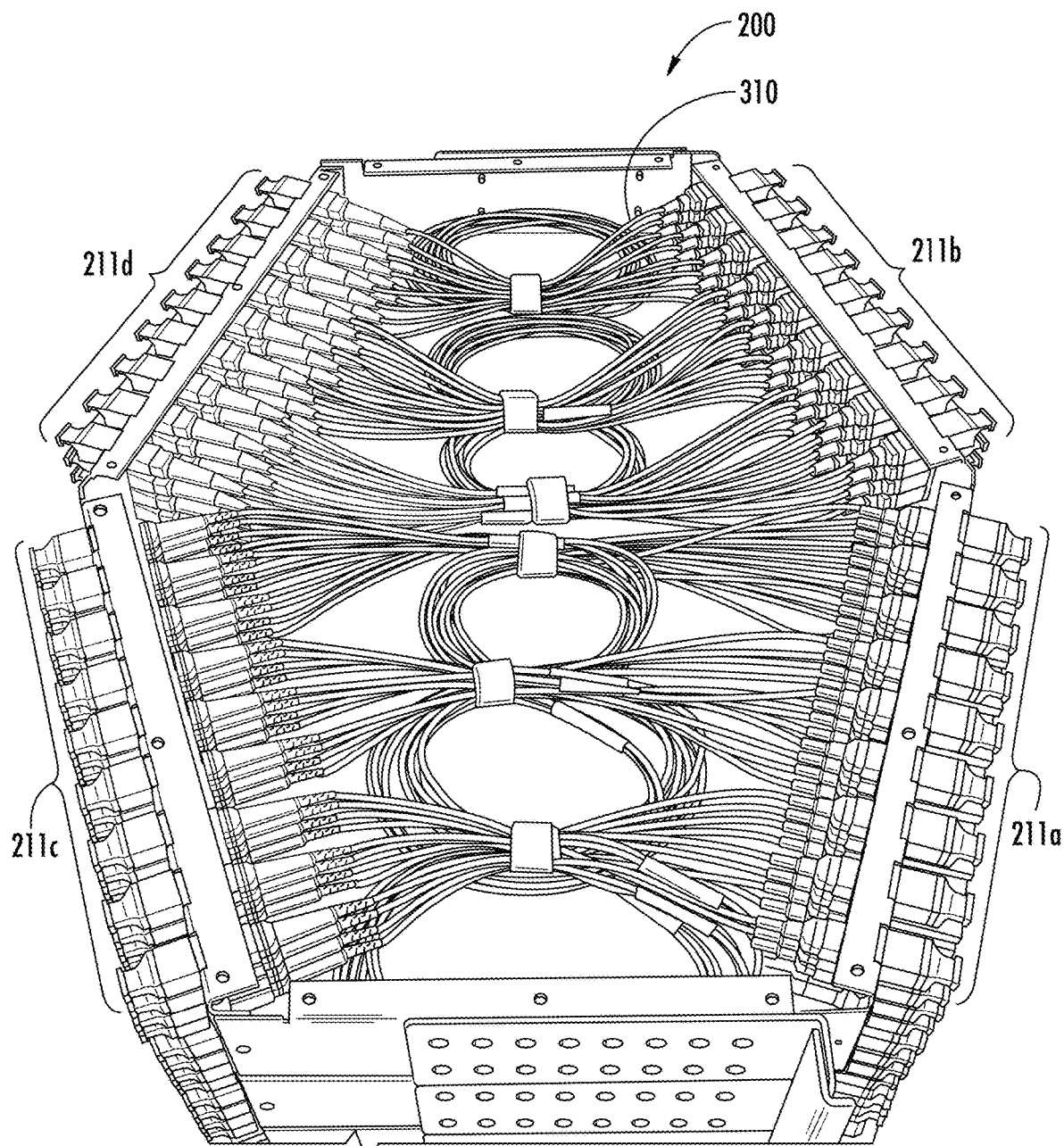
FIG. 7 shows an overhead perspective view of an exemplary 1U system for large-scale implementation of a spine-and-leaf network topology with the cover of the housing removed, in accordance with certain disclosed embodiments.

FIG. 7 provides a perspective side view of high-capacity optical interconnect module 200 with the lid removed. As shown in FIG. 7, multifiber connectors on first and second faces 211a, 211b of front facing portion are connected via wiring harnesses 310 to multifiber connectors one first and second faces 211c, 211d of rear-facing portion. As explained, the spine-and-leaf mesh wiring topology is carried out within each of wiring harnesses 310 to ensure that each connector of a first plurality of multifiber connectors disposed on the front-facing portion is optically connected to each connector of a first plurality of multifiber connectors disposed on the rear-facing portion by at least a pair of optical fibers. According to one embodiment, the first plurality of multifiber connectors disposed on the front-facing portion correspond to the first four multifiber connectors of the first column of connectors on the first face 211a of the front-facing portion of high-capacity optical interconnect module 200. The first plurality of multifiber connectors disposed on the rear-facing portion correspond to the first four multifiber connectors of the first column of connectors on the first face 211c of the rear-facing portion of high-capacity optical interconnect module 200. In other words, the first four multifiber connectors of the first column of connectors on the first face 211a of the front-facing portion of high-capacity optical interconnect module 200 and the first four multifiber connectors of the first column of connectors on the first face 211c of the rear-facing portion of high-capacity optical interconnect module 200 are optically coupled to one another by a spine-and-leaf mesh wiring harness 310 to create a first mesh unit of high-capacity optical interconnect module 200. Additional connectors of additional columns from front-facing portion and rear-facing portion are wired together to create a plurality of 8-fiber transmit and receive mesh topologies.

Components and systems consistent with the disclosed embodiments provide solutions for high-capacity optical interconnect module 200. As an alternative or in addition to the rack-mounted module described in FIGS. 1-7, there is a benefit to providing an even more modular system that is mesh-expandable. Indeed, because certain embodiments consistent with the present disclosure are described in relation to 8-, 12-, or 24-fiber mesh topologies, solutions that allow for modular "mesh-units" to be added within a rack-mounted housing that is configured to receive the individual modules.

Figure 8B:
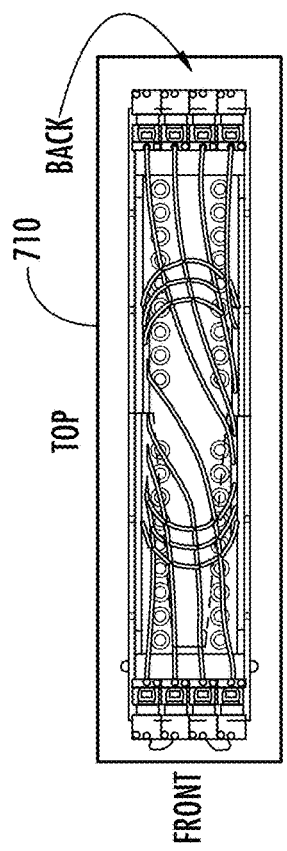
FIGS. 8A, 8B, and 8C illustrate respective top, side and wiring schematic views of an exemplary 1U system for large-scale implementation of a spine-and-leaf network topology, consistent with certain disclosed embodiments.
Figure 8C:
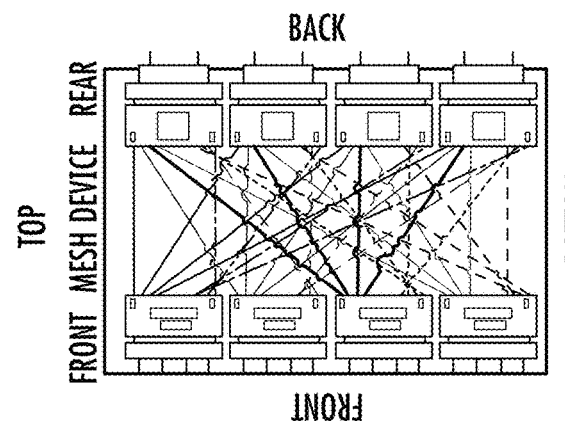
Figure 8A:
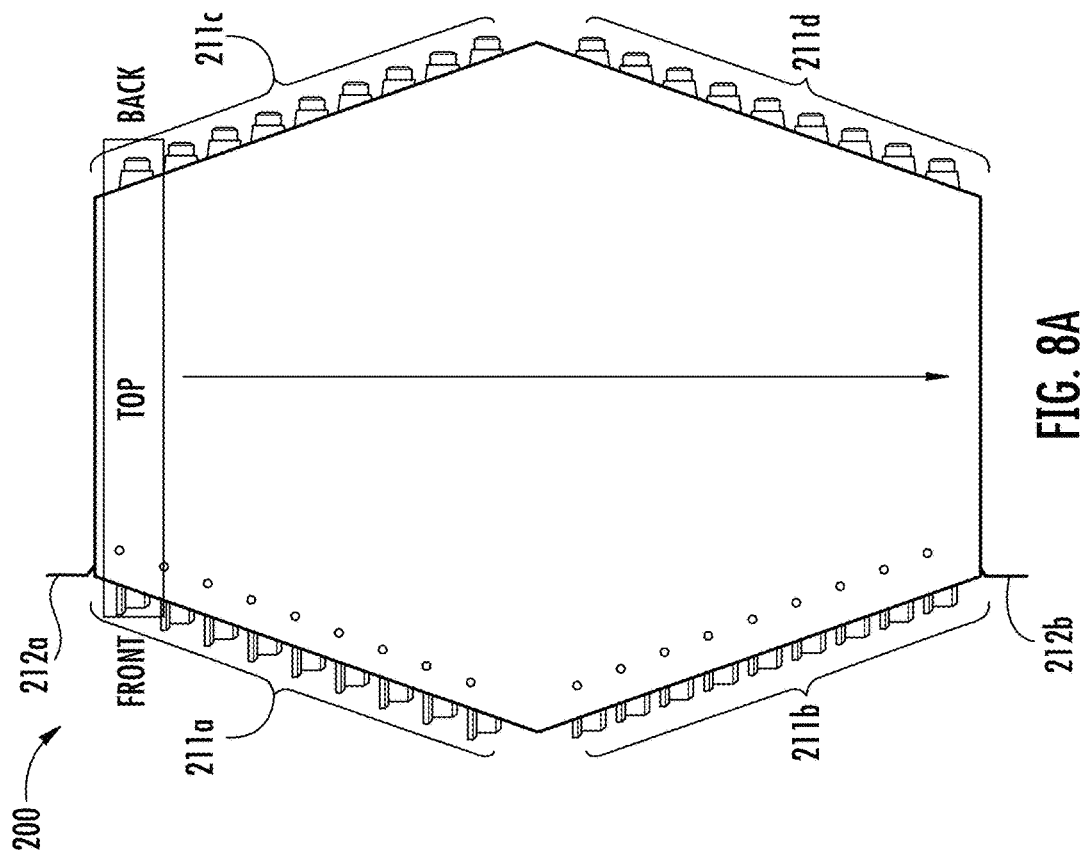

As shown in FIGS. 8A-8C, certain embodiments contemplate that high-capacity optical interconnect module 200 comprises a plurality of individual mesh wiring sets that are removably and selectively insertable within a rach housing unit. For example, as illustrated in FIG. 8A, one mesh wiring unit (denoted by the boxed portion) may me a single mesh module that can be removed and inserted within the housing. FIG. 8B shows the side view of the mesh wiring unit 710. As illustrated in FIG. 8B, the mesh wiring unit may comprise a modules that includes a mesh wiring unit (wiring schematic shown in FIG. 8C) having 4 8-fiber MTPs disposed on the front of the module, 4 8-fiber MTPs disposed on the rear of the unit, and where each connector of a first plurality of multifiber connectors disposed on the front-facing portion is optically connected to each connector of a first plurality of multifiber connectors disposed on the rear-facing portion by at least a pair of optical fibers. It is contemplated that additional and different numbers of connectors or fibers may be used to realize the mesh wiring module.

It is contemplated that a plurality of individual mesh wiring units 710 may be used together with an expandable housing to facilitate a high-capacity optical interconnect module 200 that can be expanded modularly (e.g., in phases) or all at once, allowed for maximum flexibility and cost controls. Furthermore, certain embodiments consistent with the present disclosure contemplate that the individual mesh wiring units 710 of FIGS. 8A-8C may be used in an angled housing. As such, mesh wiring units 710 toward the center of the high-capacity optical interconnect module 200 need to be of different length than those toward the edges of the high-capacity optical interconnect module 200. FIGS. 9A-9D provide alternate views of a mesh wiring unit 710 having a body with an adjustable length. As shown in the embodiments of FIGS. 9A-9D, mesh wiring units 710 may be configured to telescope along a longitudinal axis, such that the length of mesh wiring unit(s) 710 may be adjustable, depending upon the location (slot) that mesh wiring unit 710 will be inserted within high-capacity optical interconnect module 200.

Figure 11A:
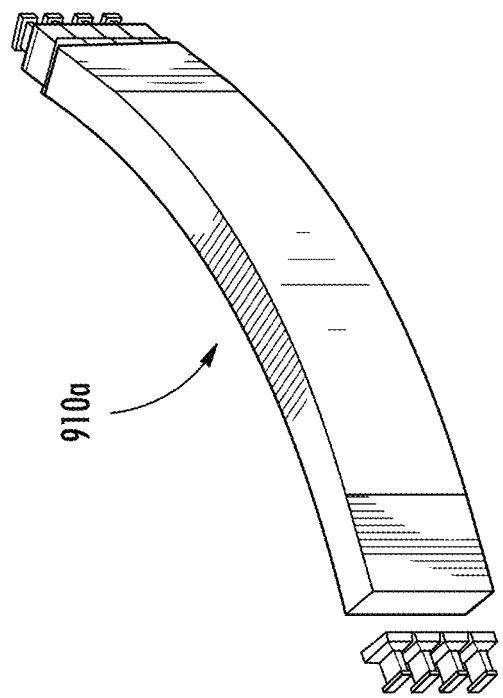
FIGS. 11A, 11B, and 11C illustrate alternative views of yet another configuration of an exemplary modular mesh wiring block designed to fit within a corresponding slot in an exemplary 1U module for large scale implementation of a spine-and-leaf network topology, consistent with certain disclosed embodiments.
Figure 11C:
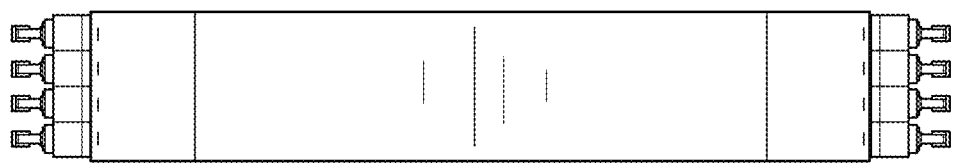
Figure 11B:
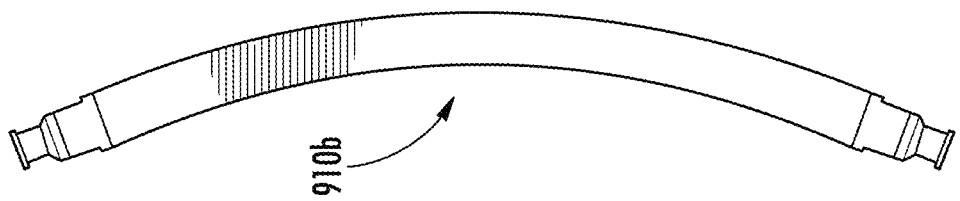

FIGS. 10A-10B and FIGS. 11A-11C illustrate alternative embodiments of the telescoping mesh wiring units 710 to compensate for the angle of pitch of the faces of high-capacity optical interconnect module 200. For example, FIGS. 10A-10B illustrate a telescoping mesh wiring unit 710 having angled portions toward the front and rear of the module, whereby the angle of the faces corresponds to the angle of the pitch of the front and rear face, respectively, of high-capacity optical interconnect module 200. Similarly, the curvature of the opposing ends of the mesh wiring units 710 of FIGS. 11A-11C are designed to correspond to compensate for the pitch of the front and rear face, respectively, of high-capacity optical interconnect module 200. In either embodiment, it is contemplated that the mesh wiring units are configured to telescope along the length of the mesh wiring unit 710 in order to be adjustably and removably inserted within pitch of the front and rear face, respectively, of high-capacity optical interconnect module 200.

It will be apparent to those skilled in the art that various modifications and variations can be made to the disclosed high-capacity optical interconnect assemblies and systems for facilitating large-scale spine and leaf topologies in a data center environment without departing from the scope of the disclosure. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A high-capacity optical interconnect module for facilitating large-scale spine and leaf topologies, comprising:
   a housing including:
      a front-facing portion that includes a first face and a second face, the first face of the front-facing portion being angled relative to the second face of the front-facing portion;
      a rear-facing portion opposing the front facing portion, the rear-facing portion including a first face and a second face, the first face of the rear-facing portion being angled relative to the second face of the rear-facing portion; and
      an internal chamber disposed between the front-facing portion and the rear-facing portion;
      a first plurality of multifiber connectors disposed on the front-facing portion;
      a first plurality of multifiber connectors disposed on the rear-facing portion;
      wherein each connector of the first plurality of multifiber connectors disposed on the front-facing portion is optically connected to each connector of the first plurality of multifiber connectors disposed on the rear-facing portion by at least a pair of optical fibers.

2. The optical interconnect module of claim 1, further comprising:
   a second plurality of multifiber connectors disposed on the front-facing portion;
   a second plurality of multifiber connectors disposed on the rear-facing portion;
   wherein each connector of the second plurality of multifiber connectors disposed on the front-facing portion is optically connected to each connector of the second plurality of multifiber connectors disposed on the rear-facing portion by at least a pair of optical fibers.

3. The optical interconnect module of claim 2, wherein the first plurality of multifiber connectors disposed on the front-facing portion are aligned in a first column of the front-facing portion.

4. The optical interconnect module of claim 2, wherein the first plurality of multifiber connectors disposed on the rear-facing portion are aligned in a first column of the rear-facing portion.

5. The optical interconnect module of claim 2, wherein the second plurality of multifiber connectors disposed on the front-facing portion are aligned in a second column of the front-facing portion.

6. The optical interconnect module of claim 2, wherein the second plurality of multifiber connectors disposed on the rear-facing portion are aligned in a second column of the rear-facing portion.

7. The optical interconnect module of claim 2, wherein the housing further includes opposing brackets for mounting in a standard 1U telecommunications equipment rack and includes at least 72 multifiber connectors on each of the front-facing portion and the rear-facing portion.

8. The optical interconnect module of claim 7, wherein each of the multifiber connectors are at least 8-fiber multifiber connectors.

9. The optical interconnect module of claim 7, wherein each of the multifiber connectors are at least 12-fiber multifiber connectors.

10. A data center network environment, comprising:
    a high-capacity optical interconnect module for facilitating large-scale spine and leaf topologies, comprising:
       a front-facing portion that includes a first face and a second face, wherein the first face of the front-facing portion is angled relative to the second face of the front-facing portion;
       a rear-facing portion opposing the front facing portion, the rear-facing portion including a first face and a second face; and
       an internal chamber disposed between the front-facing portion and the rear-facing portion;
       a first plurality of multifiber connectors disposed on the front-facing portion, wherein the first plurality of multifiber connectors disposed on the front-facing portion are aligned in a first column of the front-facing portion;
       a first plurality of multifiber connectors disposed on the rear-facing portion, wherein the first plurality of multifiber connectors disposed on the rear-facing portion are aligned in a first column of the rear-facing portion;
       a second plurality of multifiber connectors disposed on the front-facing portion; and
       a second plurality of multifiber connectors disposed on the rear-facing portion;
       wherein each connector of the first plurality of multifiber connectors disposed on the front-facing portion is optically connected to each connector of the first plurality of multifiber connectors disposed on the rear-facing portion by at least a pair of optical fibers,
       wherein each connector of the second plurality of multifiber connectors disposed on the front-facing portion is optically connected to each connector of the second plurality of multifiber connectors disposed on the rear-facing portion by at least a pair of optical fibers.

11. The data center network environment of claim 10, wherein the first face of the rear-facing portion is angled relative to the second face of the rear-facing portion.

12. The data center network environment of claim 10, wherein the high-capacity optical interconnect module further comprises the second plurality of multifiber connectors disposed on the front-facing portion are aligned in a second column of the front-facing portion.

13. The data center network environment of claim 10, wherein the high-capacity optical interconnect module further comprises the second plurality of multifiber connectors disposed on the rear-facing portion are aligned in a second column of the rear-facing portion.

14. The data center network environment of claim 10, wherein the housing further includes opposing brackets for mounting in a standard 1U telecommunications equipment rack and includes at least 72 multifiber connectors on each of the front-facing portion and the rear-facing portion.

15. The data center network environment of claim 14, wherein each of the multifiber connectors are at least 8-fiber multifiber connectors.

16. The data center network environment of claim 14, wherein each of the multifiber connectors are at least 12-fiber multifiber connectors.

17. A data center network environment, comprising:
- a high-capacity optical interconnect module for facilitating large-scale spine and leaf topologies, comprising:
  - a front-facing portion that includes a first face and a second face;
  - a rear-facing portion opposing the front facing portion, the rear-facing portion including a first face and a second face; and
  - an internal chamber disposed between the front-facing portion and the rear-facing portion;
  - a first plurality of multifiber connectors disposed on the front-facing portion, wherein the first plurality of multifiber connectors disposed on the front-facing portion are aligned in a first column of the front-facing portion; and
  - a first plurality of multifiber connectors disposed on the rear-facing portion, wherein the first plurality of multifiber connectors disposed on the rear-facing portion are aligned in a first column of the rear-facing portion;
  - wherein each connector of the first plurality of multifiber connectors disposed on the front-facing portion is optically connected to each connector of the first plurality of multifiber connectors disposed on the rear-facing portion by at least a pair of optical fibers; and
  - wherein the housing further includes opposing brackets for mounting in a standard 1U telecommunications equipment rack and includes at least 72 multifiber connectors on each of the front-facing portion and the rear-facing portion.

18. The data center network environment of claim 17, wherein each of the multifiber connectors are at least 8-fiber multifiber connectors.

19. The data center network environment of claim 17, wherein each of the multifiber connectors are at least 12-fiber multifiber connectors.

* * * * *